Oct. 12, 1948.                    R. M. GAMBLE                    2,451,210
                          CHUCK FOR AUTOMATIC MACHINE TOOLS
Filed Feb. 7, 1947                                        3 Sheets—Sheet 1
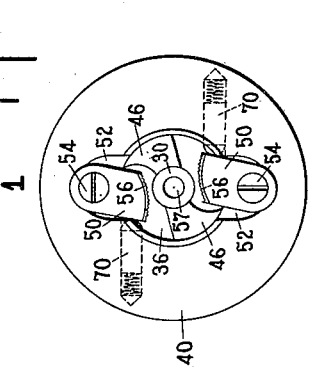
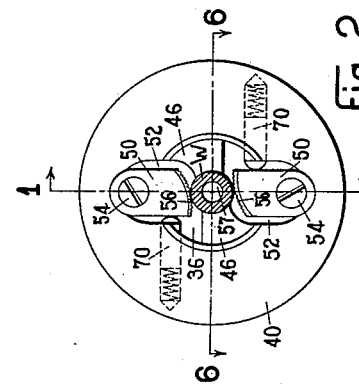
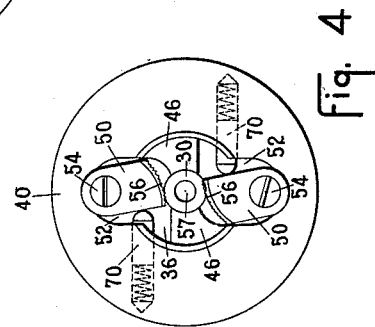
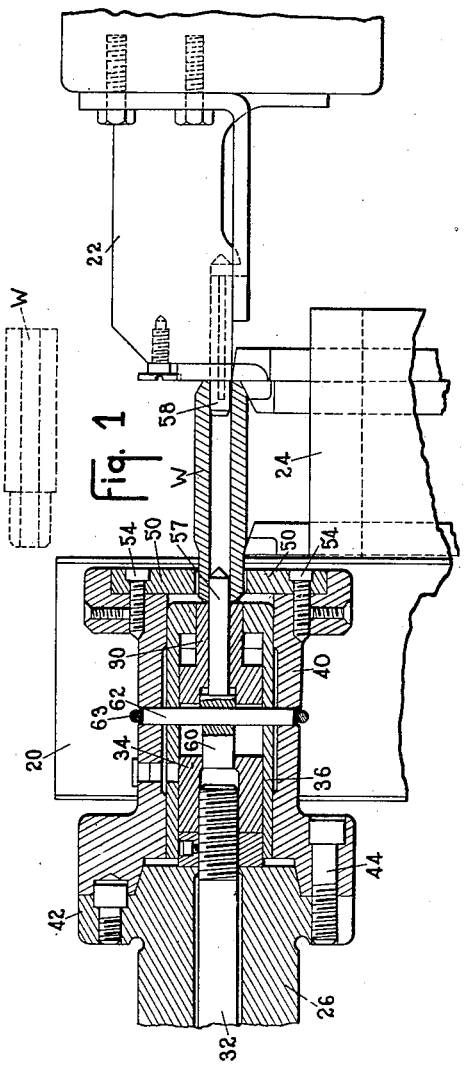
Inventor
Ralph M. Gamble
by Wright, Brown, Quinby May
Attys Oct. 12, 1948.  R. M. GAMBLE  2,451,210
CHUCK FOR AUTOMATIC MACHINE TOOLS
Filed Feb. 7, 1947  3 Sheets-Sheet 2
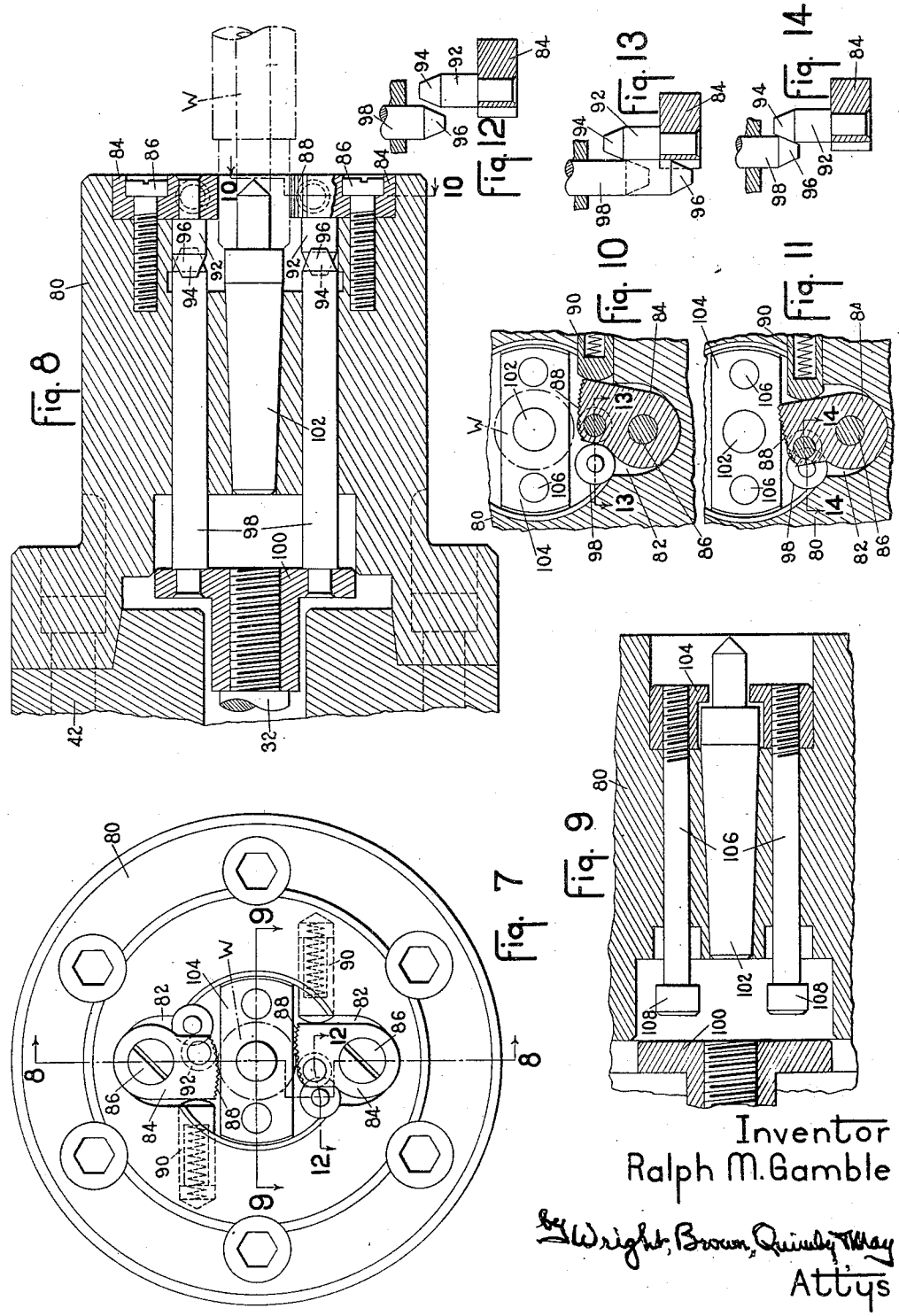
Inventor
Ralph M. Gamble
by Wright, Brown, Quinby May
Attys

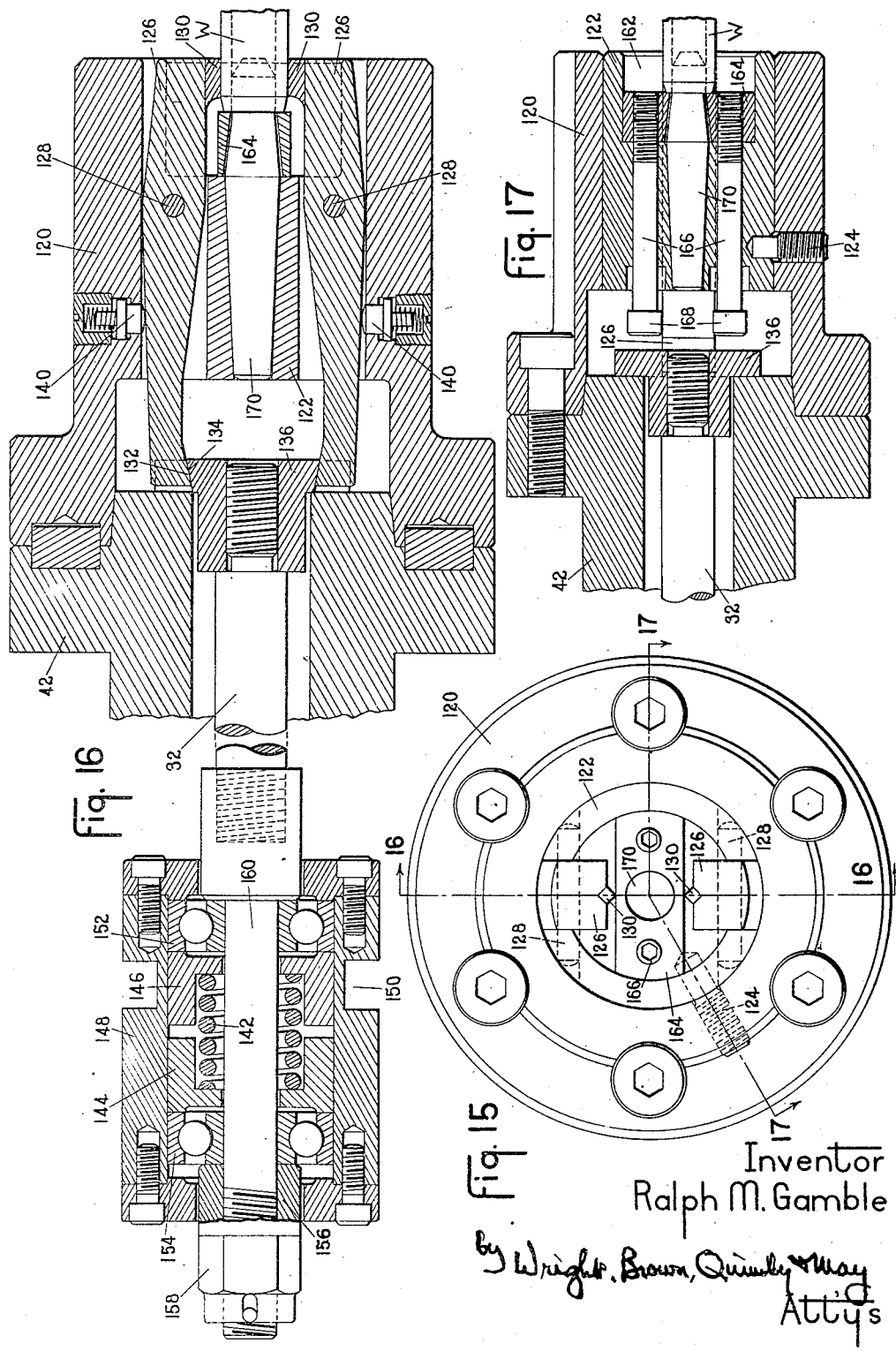

Patented Oct. 12, 1948

2,451,210

UNITED STATES PATENT OFFICE 2,451,210

CHUCK FOR AUTOMATIC MACHINE TOOLS

Ralph M. Gamble, Springfield, Vt., assignor to Jones & Lamson Machine Company, Springfield, Vt., a corporation of Vermont Application February 7, 1947, Serial No. 727,071

10 Claims. (Cl. 279—1)

This application is a continuation in part of my co-pending application Serial No. 586,935, filed April 6, 1945, for Transfer mechanism. In the pending application is illustrated an automatic lathe including a work-holding chuck which is operated by cams and suitable connecting mechanism to open and close at the proper times in each cycle of operations. The present application is directed to the structure of this chuck, to a modified form of chuck described and claimed in the pending application and to another improved form of chuck. All of these chuck structures are designed for use in an automatic machine tool, such as a lathe, to receive successive work pieces, to center each piece properly when received, to grip the piece firmly for the cutting or shaping operation to be performed thereon, and to release the piece after it has been operated on.

For a more complete understanding of the invention, reference may be had to the following description of certain embodiments thereof, and to the drawings, of which:

Figure 1 is a fragmentary elevation of a machine tool, showed partly in section on the line 1—1 of Figure 2;

Figures 2, 3, and 4 are end elevational views of the chuck shown in Figure 1 but in driving, open and empty conditions, respectively;

Figure 5 is an exploded isometric view of certain of the parts shown in Figure 1;

Figure 6 is a fragmentary section on the line 6—6 of Figure 2;

Figure 7 is a view similar to Figure 2, but to a larger scale and showing a modified construction, the chuck being closed on the work piece which is indicated by broken lines;

Figure 8 is a section on the line 8—8 of Figure 7;

Figure 9 is a section on the line 9—9 of Figure 7;

Figure 10 is a section on the line 10—10 of Figure 8;

Figure 11 is a view similar to Figure 10, but showing the chuck empty;

Figure 12 is a section on the line 12—12 of Figure 7;

Figure 13 is a section on the line 13—13 of Figure 10;

Figure 14 is a section on the line 14—14 of Figure 11;

Figure 15 is a view similar to Figure 7 but of another modified form of the invention;

Figure 16 is a section on line 16—16 of Figure 15;

Figure 17 is a section on the line 17—17 of Figure 15.

Portions of the headstock 20, the tailstock 22 and a tool carriage 24 of a machine tool such as an automatic lathe are shown in Figure 1. The headstock spindle 26 is provided with work-ejecting means movable in time with the retraction and advancement of the tailstock, one such means being illustrated in Figures 1 to 6. As therein shown, an ejector 30 is attached to the end of an axially reciprocable rod 32 which extends through the headstock and is actuated by suitable cam means as described in my said application Serial No. 586,935. The ejector 30 is a reduced extension of a cylinder 34 which is screw threaded on the end of a rod and is fitted in the bore of a sleeve 36. This sleeve is cylindrical and is fitted in the bore of the chuck body 40 which is secured to the spindle nose 42 by screws 44. The forward end of the sleeve 36 is provided with a pair of arcuate fingers 46 which are located between a pair of jaws 50, the latter being pivotally mounted in recesses 52 in the forward end of the chuck body 40. Each jaw 50 is rockable about an axis 54 and has an arcuate serrated end face 56 which is eccentric with respect to the axis 54 and which is adapted to engage the work piece W. The eccentricity of the work-engaging faces of the jaws causes the jaws to grip the work more firmly when rotation of the work with the chuck is resisted by the cutting tool. As shown in Figure 1, the work piece may be a hollow cylindrical member, an end of which is adapted to be gripped by the jaws 50, the work piece receiving a headstock center 57 in one end and a tailstock center 58 in the other end to hold the work piece properly centered while it is being operated upon.

The headstock center 57 fits within the bore of the ejector 30, the rear portion 60 thereof being enlarged to fit slidably within the larger bore of the cylinder 34. In order to hold the center against movement relative to the chuck body 40, it is connected thereto by a pin 62 which passes diametrically through the chuck body and the members concentrically disposed therein, that is, the sleeve 36, the cylinder 34 and the rear portion 60 of the center. A circular spring 63 is provided to encircle the chuck body 40 and engage the ends of the pin 62 to keep the pin in place. Longitudinal slots 64 in the cylinder 34 and peripheral slots 65 in the sleeve 36 are provided for the pin 62 so that it will not interfere with desired movements of the cylinder and sleeve relative to the chuck body. The sleeve 36 is provided with a pair of inwardly projecting pins 66 which ride in angularly disposed grooves 68 in the cylinder 34 so that when the cylinder 34 is advanced or retracted by the rod 32, the sleeve 36 is rotated through a limited angle in one direction or the other according to the direction of movement of the cylinder 34. The fingers 46 are adapted to engage the corresponding jaws 50 as indicated in Figure 3 to rock the jaws so that their work engaging faces 56 are moved out of engagement with a work piece, this rocking movement being against the pressure of spring pressed plungers 70 located in the forward end of the chuck. Work releasing rotation of the sleeve 36 is brought about by forward movement of the cylinder 34, such forward movement also resulting in the ejection of the work piece from the chuck by the ejector 30 which is an extension of the cylinder 34.

Figure 2 illustrates the position of the jaws 50 when pressed into engagement with the work piece by the plungers 70, the fingers 46 at this time being retracted from engagement with the jaws.

Figure 3 shows the jaws 50 held in their work releasing position by the fingers 46.

Figure 4 shows the position taken by the jaws 50 when the fingers 46 have been rocked back out of engagement with the jaws but there is no work piece between the jaws to be gripped thereby.

Figures 7 to 14 illustrate a modified form of chuck secured to the spindle nose 42, the work gripping means and the ejector being operated by an actuating rod 32. The chuck body 80 is recessed at its forward end as at 82, a pair of jaws 84 being rockably mounted on pivots 86 within the recesses. Each jaw 84 is provided with a serrated end piece 88 which is arcuate and is eccentric with respect to the axis of the pivot 86 so as to engage the work piece W (indicated in broken lines in Figures 7 and 8) when pressed into engagement with the work piece by spring pressed plungers 90. Each jaw 84 is provided with a rearwardly projecting stud 92 having a frustoconical end 94 arranged to be engaged by a corresponding frustoconical end 96 of a rod 98. The two rods 98 fit slidably in holes in the chuck body, the rear ends of these rods being secured to an actuator 100 which is screw threaded in the end of the actuating rod 32. When the actuator 100 is moved forward by the rod 32, the forward movement of the rods 98 causes the conical ends 96 thereof to engage corresponding ends 94 of the stud 92 as indicated in Figures 13 and 14. The rods 98 thus exert a camming action on the studs 92 which causes the jaws 84 to rock to work releasing position, this position being indicated in Figures 10 and 13. When the rods 98 are retracted by the actuator 100, the jaws 84 are held in the positions indicated in Figure 12 if a work piece is in position between the jaws, but in the position illustrated in Figures 11 and 14 if no work piece is in position.

A headstock center 102 with a tapered shank is mounted in the chuck body with the forward end projecting to enter an end of the work piece W as indicated in Figure 8 so as to hold the work piece properly centered.

An ejector mechanism is illustrated in Figures 7 and 9. This mechanism includes an ejector 104 which is mounted on the forward ends of a pair of rods 106, the latter being slidably fitted into holes in the chuck body 80. The rear ends of the rods 106 have heads 108 engageable by the actuator 100 when the latter moves forward. As indicated in Figure 9, there is a substantial space between the actuator 100 and the heads 108 when the actuator is in its fully retracted position. Thus, when the actuator is advanced by the rod 32, the first part of its movement results in the rocking of the jaws 84 to work releasing position, whereupon the actuator engages the heads 108 of the ejector rod 106 so that the remainder of its forward stroke results in the ejection of the work piece which has thus been released by the jaws as before.

Another modified form of chuck is illustrated in Figures 15 to 17. This chuck comprises a housing 120 which is secured to the spindle nose 42 by any suitable means. Within the housing 120 is fitted a cylindrical body member 122 which is secured in place by a set screw 124 inserted through the wall of the housing. The body member has two longitudinal grooves in its periphery within which are fitted two levers 126. These levers are adapted to rock about transverse shafts 128. Each lever at its forward end is provided with a work gripping jaw 130 which, as indicated in Figure 15, may be in the form of a single tooth. Each lever at its rear end has an inclined cam surface 132 engageable by a corresponding cam surface 134 on a floating actuator 136 which is secured to the forward end of the actuating rod 32. As shown in Figure 16, the cam surfaces 132 and 134 are so arranged that retractive movement of the actuator 136 rocks the levers 126 to work gripping positions. Since the actuator 136 is a floating member, it equalizes the pressures of the individual jaws on the work piece and accurately centers the same. Thus, if a work piece is slightly eccentric, it will not be forced off center by one of the jaws. When the actuator is advanced toward the front of the chuck, the levers are released from their work gripping positions and are pressed to work releasing positions by spring pressed plungers 140 which are mounted in the wall of the chuck housing. Since the action of the camming surfaces 132 and 134 is positive, it is desirable that a resilient element be employed in the actuating mechanism. Such element is provided through the use of a compression spring 142 which is confined between caps 144 and 146 in a housing 248. This housing has two parallel grooves 150 to receive the forked end of a lever (not shown) by which the housing is shifted to the right or left without the outer casing of the housing being required to revolve when the lever is actuated by suitable cams in the customary manner. The housing 148 presses against the spring cap 146 through a set of ball bearings 152, this pressure being communicated through the spring and the cap 144 to a set of ball bearings 154 which engage against a collar 156, this collar bearing against a nut 158 which is secured on an extension 160 of the actuator rod 32. Hence, pressure exerted on the housing 148 toward the left, as shown in Figure 16, pulls the actuator 136 toward the left, the pressure being exerted through the spring 142 which is the resilient element in the actuating mechanism. The spring 142 is preferably of considerable weight and stiffness so that the jaws 130 engage the work pieces W with a firm grip.

The chuck body member 122 is recessed at its forward end as at 162, a work ejector 164 being disposed within this recess. The work ejector is secured to a pair of rods 166 which extend through longitudinal holes in the body 122, the rear ends of these rods having heads 168 which are engageable by the actuator 136 after the latter has moved through a portion of a stroke toward the right to release the work gripping jaws 130. When the jaws have released the work, the actuator 136 engages the heads 168 of the ejector rods and thereupon moves the ejector toward the right to eject the work piece W from the chuck. The body 122 also is provided with a central tapered hole within which is fitted a chuck center 170. The forward end of the center enters the hollow of the work piece to hold the work piece properly centered during the tooling operation.

I claim:

1. In combination, a chuck comprising a body member, a pair of work engaging jaws rockably mounted within said body member, means for rocking said jaws back and forth between work-engaging and work-releasing positions, said means comprising spring means resiliently pressing said jaws toward one said position and cam means operable to rock said jaws against the pressure of the spring means to the other said position, a work ejector slidably mounted in said body member and movable to eject a work piece axially with respect to the chuck from between said jaws, and a reciprocable actuating rod coaxial with the chuck and operatively connected with said cam means and said ejector.

2. In combination, a chuck comprising a body member, a pair of work engaging jaws rockably mounted within said body member, means for rocking said jaws back and forth between work-engaging and work-releasing positions, said means comprising spring means resiliently pressing said jaws toward one said position and cam means operable to rock said jaws against the pressure of the spring means to the other said position, an actuating rod coaxial with said chuck and longitudinally reciprocable to actuate and release said cam means, and a work ejecting means having a lost-motion connection with said actuating rod for ejection of a work piece after it has been released by said jaws.

3. In combination, a chuck comprising a body member, a pair of work engaging jaws rockably mounted within said body member, means for rocking said jaws back and forth between work-engaging and work-releasing positions, said means comprising spring means resiliently pressing said jaws toward one said position and cam means operable to rock said jaws against the pressure of the spring means to the other said position, an actuating rod coaxial with said chuck and longitudinally reciprocable to actuate and release said cam means, and a work ejecting means consisting of a pair of rods slidably mounted in said body member parallel to said actuating rod and having a lost-motion connection for operation thereby after release of a work piece by said jaws and a work-engaging cross piece secured to the forward ends of said pair of rods.

4. In combination, a chuck comprising a cylindrical body member, a pair of work-engaging jaws rockably mounted within said body member, spring means pressing said jaws toward work-releasing position, an actuating rod longitudinally reciprocable with respect to said body member, cam means in said body operable by final rearward movement of said actuating rod to cam said jaws to work-gripping position and by initial forward movement of said actuating rod to release said jaws, and work ejecting means operable by final forward movement of said actuating rod to eject work pieces from said jaws.

5. A chuck comprising a cylindrical body member, a pair of levers rockably mounted in said body member and extending longitudinally thereof, said levers having opposed work-engaging jaws at the forward ends thereof and cam edges along the rear portions thereof, spring means pressing said jaws toward work-releasing positions, an actuating rod coaxial with said body member and axially reciprocable, and cam means mounted on said rod for engagement with said cam edges to rock said levers against the pressure of said spring means to move the jaws into work-engaging positions.

6. A chuck comprising a body member, a pair of work-engaging jaws rockably mounted in said body member, relatively weak spring means pressing said jaws toward work-releasing position, an actuating rod longitudinally reciprocable with respect to said body member, cam means in said body member operable by rearward movement of said actuating rod to cam said jaws to work-gripping position, and a relatively strong spring link on said actuating rod whereby movements of said actuating rod are stiffly resilient.

7. In combination, a chuck comprising a body member, a pair of work-engaging jaws rockably mounted in said body member, relatively weak spring means pressing said jaws toward work-releasing position, an actuating rod longitudinally reciprocable with respect to said body member, cam means in said body member operable by rearward movement of said actuating rod to cam said jaws to work-gripping position, a work ejector slidably mounted in said body member for ejection of work pieces from between said jaws and operable by forward movement of said actuating rod, and a relatively strong spring link on said actuating rod whereby movements of the actuating rod are stiffly resilient.

8. In combination, a chuck having opposed pivoted work-engaging jaws, an ejector movable axially of said chuck for engaging and ejecting work from between said jaws, a member having portions for engagement with side faces of said jaws, and operative connections between said ejector and member causing ejecting axial motion of said ejector to rock said member and cause said portions to swing said jaws in work-releasing directions.

9. In combination, a chuck having movable opposed work-engaging jaws, springs acting on said jaws tending to move said jaws to close upon work carried by said chuck, a work-ejector carried by said chuck and movable axially thereof to eject work from between said jaws or to retract to permit work to be placed between said jaws, a member movable axially of said chuck and having a lost motion connection to said ejector, and means carried by said movable member for engaging and separating said jaws from the work during the taking up of said lost motion thereby to effect release of the work before the ejecting action of said ejector and to permit the jaws to close upon the work after said ejector has been retracted.

10. In combination, a rotatable spindle, a chuck carried by said spindle and having a body, opposed work-engaging jaws pivoted to said body, spring means engaging said jaws and tending to move to and hold said jaws closed upon work carried by said chuck, an ejector for engaging the end of work positioned between said jaws, rods secured to said ejector and axially slidable through said body parallel to the axis of rotation of said chuck, an actuator slidable axially through said spindle and having a head positioned to impinge on said rods and actuate said ejector to eject work from between said jaws on motion in one direction of said actuator, elements carried by said actuator and extending through said body, said elements and jaws having coacting wedge faces shaped and positioned to cause motion of said actuator from a retracted position to first wedge said jaws about their pivots away from work-engaging position and thereafter to engage said rods and actuate said ejector to force the work from between said jaws.

RALPH M. GAMBLE.

No references cited.